Oct. 5, 1926.

S. ZEFF ET AL 1,601,900

NONSKID BRAKE

Filed May 5, 1924

INVENTOR.
Samuel Zeff
Louis A. Colella
BY
Thos. L. Donnelly
ATTORNEY.

Patented Oct. 5, 1926.

1,601,900

UNITED STATES PATENT OFFICE.

SAMUEL ZEFF AND LOUIS A. COLELLA, OF DETROIT, MICHIGAN; SAID LOUIS A. COLELLA ASSIGNOR TO SAID SAMUEL ZEFF.

NONSKID BRAKE.

Application filed May 5, 1924. Serial No. 710,998.

Our invention relates to a new and useful improvement in a nonskid brake and is intended as an improvement over the application filed by us on March 5, 1924, Serial No. 696,968. The present invention is adapted for preventing the skidding of vehicles and particularly automobiles when brought to a stop, or when making a turn.

The present invention has as its object the provision of a device which will be simple and durable in structure, while at the same time, economical of manufacture.

Another object of the invention is the provision of a positive thrusting means for directing the contacting member against the surface over which the vehicle is being propelled, so as to prevent lateral movement or skidding of the vehicle.

Other objects will appear hereinafter.

The invention consists in the combination and arrangement of parts hereinafter described and claimed.

Figure 1:
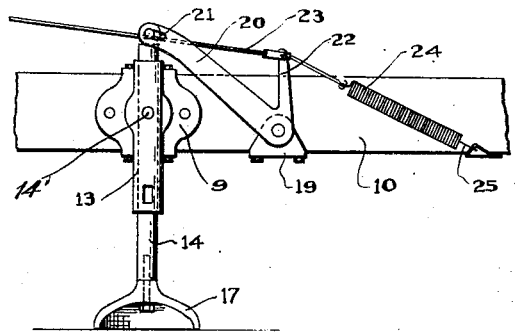
Figure 2:
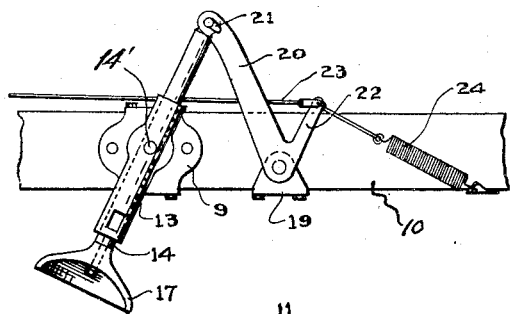
Figure 3:
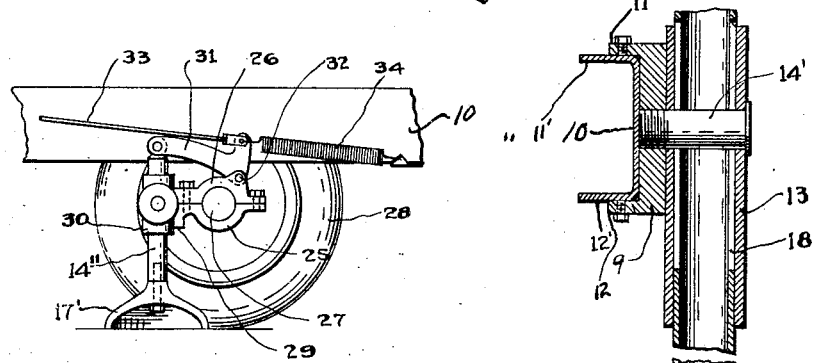
Figure 4:
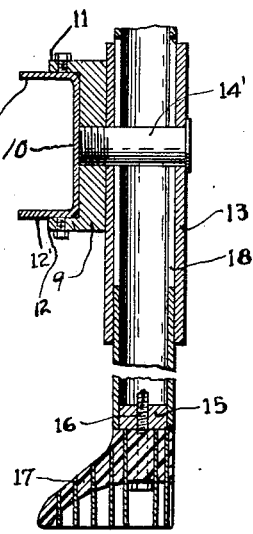

The invention will be best understood from a reference to the accompanying drawings which form a part of this specification and in which, Fig. 1 is a side elevational view of the invention, Fig. 2 is a side elevational view of the invention in inoperative position, Fig. 3 is a side elevational view of a modified form of the invention, Fig. 4 is a longitudinal central sectional view of the invention.

The invention, in its preferred form, comprises a bracket 9 which is attached to the chassis frame 10 of the automobile, or vehicle with which used, suitable bolts being projected through the lower flange and through the upper flange, said bracket being provided with flanges 11 and 12 which embrace the flanges 11' and 12' of the chassis frame 10. The bracket is provided with an elongated sleeve 13 in which is slidably positioned a thrust arm 14. Projected through the sleeve 13 is a suitable bolt 14' which serves to bind the sleeve to the bracket, and if desired, to the chassis. In this way the sleeve is adjustable relatively to the bracket, being permitted to swing on the stud, or bolt, 14', as a pivot. The member 14 is formed preferably tubular, except at its lower end where it has a plug 15 inserted, for the reception of a bolt 16 which serves to bind a gripping or contact shoe 17. The member 14 is provided with an elongated slot 18 in which the stud or bolt 14' is adapted to ride upon the slidable movement of the member 14 in the sleeve 13. A bell crank is pivotally mounted on a suitable bracket 19 which is secured to the chassis by suitable bolts, one arm 20 of the bell crank being provided with an elongated slot 21 in which engages a bolt fastened to the upper end of the arm or thrust member 14. The opposite arm 22 is pivotally attached to a rod 23 which may be connected to any suitable lever for causing a rocking of the bell-crank lever to bring about a downward thrust of the tubular thrust member 14. This rod 23 may be mounted to the ordinary brake pedal of the vehicle, if desired, or it may be connected to an individual lever or pedal for operating the same. Attached to one end of the arm 22 is a coil spring 24, the opposite end 25 of which is attached to the chassis. The purpose and function of the spring 24 is to normally retain the tubular member in elevated position relatively to the sleeve 13, so as to cause the contact member 17 to remain free from the surface over which the vehicle is being propelled. This contact member is, as shown in the drawings, formed preferably from rubber and substantially semi-spherical in form so as to provide a certain amount of suction when brought into contact with the surface over which it passes. As shown in Fig. 4, a number of steel reinforcing members are imbedded in the rubber shoe, or contact member 17, and terminate slightly within the surface thereof, so that upon the pressing of the shoe into engagement with the ground under great strain, the steel reinforcing members will also serve to grip the surface over which the vehicle is being propelled.

In the form shown in Fig. 3, we have provided a bracket comprising a pair of parts 25 and 26 which are adapted to embrace the axle 27 of the vehicle upon which the wheel 28 is mounted. Suitable bolts serve to clamp these parts in engagement with the axle and the bracket is provided with an outwardly extending portion 29 on which a sleeve 30, which is comparatively short, is pivotally mounted in any well known suitable manner. Slidably mounted in the sleeve 30 is the thrust member 14'' having the contact bearing member, or shoe, 17' mounted thereon. A similar connection of the bellcrank 31 to the thrust member is provided, the bell crank being pivotally mounted on lugs 32 formed on the member 26. The connecting or operating rod 33 is connected to the bell crank as well as the spring 34.

In the present invention, the novel arrangement of the thrust member is such as to effect a true and accurate movement of the thrust member at all times, operating under all conditions, and the sleeve serves to reinforce the side strain or torsion exerted upon the thrust member, when the same is brought into engagement with the surface over which passing.

While we have illustrated and described the preferred form of structure, we do not wish to limit ourselves to the precise form of structure shown but desire to avail ourselves of such variations and modifications as come within the scope of the appended claim.

Having thus described our invention what we claim as new and desire to secure by Letters Patent is:

A non-skid brake of the class described comprising a U-shaped supporting bracket adapted for mounting with the legs in embracing relation to a supporting surface upon which mounted; a guide sleeve; a bolt projected through said sleeve and threaded into the bight of said bracket, for mounting said sleeve pivotally on said bracket; a tubular thrust member slidably positioned in said sleeve, and provided with a longitudinally extending slot for accommodating said bolt; a plug secured in the lower end of said tubular member; a yieldable shoe mounted on said plug; and metallic reenforcing members mounted in said shoe; a pivotally mounted bell crank for effecting longitudinal movement of said thrust member, said shoe being moved to operative position upon movement of said thrust member in one direction; and means for moving said shoe to inoperative position.

In testimony whereof, we have signed the foregoing specification.

SAMUEL ZEFF.
LOUIS A. COLELLA.